United States Patent Office 3,231,469
Patented Jan. 25, 1966

3,231,469
β-BENZALBUTYRAMIDE AS AN ANTI-CHOLESTEROLEMIC AGENT
Luigi Canonica, Milan, Italy, assignor to Istituto Biochimico Italiano, Milan, Italy, a corporation of Italy
No Drawing. Filed Apr. 21, 1961, Ser. No. 104,518
Claims priority, application Italy, Mar. 18, 1961,
5,092/61
6 Claims. (Cl. 167—65).

The present invention relates to a new drug efficacious in the treatment of patients having abnormally high blood cholesterol and lipid levels the active ingredient of which is the amide of β-benzalbutyric acid having the formula

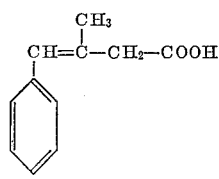

β-benzalbuytramide can be prepared according to the process disclosed in my copending application Serial No. 84,516 filed January 24, 1961, and now abandoned, wherein β-benzylcrotonic esters are treated with ammonia in an aqueous or alkaline solution to form on the migration of the double bond, the desired β-benzylbutyramide.

In the course of the investigations which led to the practical use of this drug in the treatment of hyperlipidemias, and essential hypercholesterolemia there has been verified the intense anticholesterolemic and antilipedemic action exerted by acids characterized by a branched saturated or unsaturated aliphatic chain, in particular by an aliphatic chain having the atomic arrangement of isoprene, linked to an aromatic ring substituted or unsubstituted in the para position. It has been verified that such action is common to the free acids, to their salts (alkaline, alkaline-earth, ammonium), and to their simplest functional derivatives (esters with aliphatic alcohol, substituted or non-substituted amides).

β-benzalbutyramide has been shown to be particularly efficacious in this respect.

The biological, pharmacological, and clinical activity of β-benzalbutyramide is shown by the following observations:

(1) *Action on hypercholesterolemia from Triton WR 1339 in rats.*—A certain number of rats were treated with 500 mg./kg. of Triton WR 1339 peritoneally and simultaneously with various doses of β-benzalbutyramide. It was verified that the amide of β-benzalbutyric acid substantially inhibited, even in doses of 85 mg./kg., hypercholesterolemia caused by the Triton.

(2) *Action on hypercholesterolemia, hyperlipidemia and hyperpolisaccaridemia from estrogens in chickens.*—Three weeks old roosters, treated with a single injection of 3 mg. of estradiol cyclopenthylpropionate in cottonseed oil (technique of Caldwell and Suydam) and then for 7 days with doses of 400 mg./kg. of β-benzalbutyramide orally, present a blood level of lipids, cholesterine and polysaccharides as well as free and esterified cholesterine, exactly equal to that of control animals not treated with estrones. The increase of cholesterolemia, lipidemia, and polysaccharidemia is strongly inhibited even by doses of 200 mg./kg. The animals treated with estrogens without administration of β-benzalbutyramide have more than double the levels of lipids, cholesterine and polysaccharides.

The following table shows the results of these tests:

| | Total lipids, mg. percent | Cholesterol, mg. percent | Polysaccharides, mg. percent |
|---|---|---|---|
| Control animals not treated with estrogens | 810 | 148 | 67 |
| Animals treated with single doses of estrogen | 1,850 | 330 | 104 |
| Animals treated with estrogen and 400 mg./kg. of β-benzalbutyramide | 830 | 178 | 66 |

(3) *Action on the biosynthesis of long chain fatty acids.*—Even in doses of 0.40 micromole/ml., β-benzalbutyramide almost completely (90%) blocks the formation of acetylphosphate and of acyl-AMP.

(4) *Action on the biosynthesis of fatty acids of cholesterol in liver sections incubated with $1C^{14}$ acetate and $2C^{14}$ mevalonate.*—In the tests on liver sections incubated with labeled isotopes, in the proportion of 1 micromole/ml., β-benzalbutyramide causes 25% inhibition in the synthesis of fatty acids, 40% inhibition in the synthesis of cholesterol starting with the acetate and 25% starting from the mevalonate.

(5) *Clinical use.*—In the clinical tests, the preparation was used on 46 arteriosclerotic subjects with cholesterolemia higher than 250 mg. percent, with an average of 350 mg. percent, and proved strongly hypocholesterolemic and hypolipidemic in the daily dose of 200–250 mg. Beginning with the fourth week of cure, the cholesterol level lowers, depending on the case, from a minimum of 55 mg. percent to a maximum of 155 mg. percent, with an average of 90 mg. percent. At the same time, the lipid level undergoes an average lowering of 240 mg. percent. The relation of beta/alpha lipoproteins is rapidly modified, passing from a value of 6–7 to a value of 2.8–3: in other words, it returns completely to normal. A conspicuous diminution of uricemia is likewise noted, which in subjects with arteriogenic tendency is very often exceedingly high.

The tolerability of the drug is perfect. Even in protracted treatment for over six months, no modification of the hematopoietic system, of the urine, of the hepatic functionality or of the coenesthesia, was observed. The gastric tolerance is also excellent.

The modification of the humoral biochemical pattern often accompanies the treatment of coronary disturbances.

With respect to new anticholesterinemic drugs such as Triparanol and Benzmalacene, β-benzalbutyramide has the very important advantage of acting only on the pathologic lipidemic and cholesterolemic levels and of not disturbing normal ones nor of reducing the cholesterinic content of normal organs and of normal red globules, which excludes any disturbance whatsoever of the metabolism or toxic action as, moreover, is evidenced by the complete clinical tolerance which is even confirmed by functional tests for the liver.

The daily dose for man is 250 mg., administered twice, but may be augmented in particular cases. The effect on lipids and on cholesterol is already noticed in some cases after 8–10 days, and on the average between the third and fourth week, after which it remains constant. Once the desired effect is obtained, periods of suspension of not more than 15 days may be intercalated. Practically (as with insulin in the diabetic) β-benzalbutyramide must be used regularly by whoever has a tendency to arteriogenic dislipidemia, with brief pauses between one cycle of cure and the other.

I claim:

1. A process for treating a patient having abnormally high blood cholesterol and lipid levels which comprises orally administering to said patient an amount of β-benzalbuyramide effective to lower said levels to ones within a safe range and maintain them within this range.

2. A process as claimed in claim 1 wherein said compound is administered in daily amounts of from about 200 to about 250 mg.

3. A process as claimed in claim 2 wherein said daily amounts are given in two dosages.

4. A drug in dosage unit form containing an amount of β-benzalbutyramide effective to lower high blood cholesterol and lipid levels to ones within a safe range and maintain them within this range and a pharmaceutically acceptable carrier.

5. A drug in dosage unit form containing from about 200 to about 250 mg. of β-benzalbutyramide and a pharmaceutically acceptable carrier.

6. A drug in dosage unit form containing from about 100 to about 125 mg. of β-benzalbutyramide and a pharmaceutically acceptable carrier.

References Cited by the Examiner
UNITED STATES PATENTS 2,937,117   5/1960   Cottet _____ 167—65

OTHER REFERENCES

Rossi, Bull. Soc. Ital. Biol. Sper., XXXVI, 1960, vol. 36, pp. 1914–14.

II. Farmaco, Ed. Sci., 1959, vol. 14, pp. 112–13.

Scarselli, Bull. Soc. Italiana Biol. Sper., vol. 36, Dec. 31, 1960, pp. 1958–1960.

JULIAN S. LEVITT, *Primary Examiner.*

M. O. WOLK, FRANK CACCIAPAGLIA, JR.,
*Examiners.*

ANNA P. FAGELSON, *Assistant Examiner.*